(12) United States Patent
Xie et al.

(10) Patent No.: US 12,389,460 B2
(45) Date of Patent: Aug. 12, 2025

(54) INFORMATION SENDING METHOD, INFORMATION RECEIVING METHOD AND DEVICE

(71) Applicants: CHINA MOBILE COMMUNICATION CO., LTD RESEARCH INSTITUTE, Beijing (CN); CHINA MOBILE COMMUNICATIONS GROUP CO., LTD., Beijing (CN)

(72) Inventors: Fang Xie, Beijing (CN); Guangyi Liu, Beijing (CN)

(73) Assignees: CHINA MOBILE COMMUNICATION CO., LTD. RESEARCH INSTITUTE, Beijing (CN); CHINA MOBILE COMMUNICATIONS GROUP CO., LTD., Beijing (CN)

( * ) Notice: Subject to any disclaimer, the term of this patent is extended or adjusted under 35 U.S.C. 154(b) by 390 days.

(21) Appl. No.: 18/010,834

(22) PCT Filed: Jun. 21, 2021

(86) PCT No.: PCT/CN2021/101339
§ 371 (c)(1),
(2) Date: Dec. 16, 2022

(87) PCT Pub. No.: WO2021/254520
PCT Pub. Date: Dec. 23, 2021

(65) Prior Publication Data
US 2023/0239930 A1 Jul. 27, 2023

(30) Foreign Application Priority Data
Jun. 19, 2020 (CN) .......................... 202010568297.7

(51) Int. Cl.
*H04W 74/0833* (2024.01)

(52) U.S. Cl.
CPC ............................... *H04W 74/0833* (2013.01)

(58) Field of Classification Search
CPC ................................................. H04W 74/0833
(Continued)

(56) References Cited

U.S. PATENT DOCUMENTS 9,265,076 B2  2/2016  Schmidt
9,491,780 B2  11/2016 Pang
(Continued)

FOREIGN PATENT DOCUMENTS

CA    3013652 A1   8/2017
CA    3024585 C    2/2021
(Continued)

OTHER PUBLICATIONS

International Search Report in the international application No. PCT/CN2020/112850, mailed on Dec. 9, 2020. 2 pages.
(Continued)

*Primary Examiner* — Sibte H Bukhari
(74) *Attorney, Agent, or Firm* — Cooper Legal Group, LLC

(57) ABSTRACT

Provided in the present application are an information sending method, an information receiving method, a terminal, a network device and a storage medium. The information sending method includes a terminal records 2-step random access related information; and the terminal sends the 2-step random access related information to a network.

8 Claims, 9 Drawing Sheets

(58) Field of Classification Search
USPC .................................................... 370/329
See application file for complete search history.

(56) References Cited

U.S. PATENT DOCUMENTS

| | | | |
|---|---|---|---|
| 9,949,298 B1 | 4/2018 | Akoum | |
| 9,960,830 B2 | 5/2018 | Yoo | |
| 10,091,759 B2 | 10/2018 | Lin | |
| 10,185,052 B2 | 1/2019 | Inanc | |
| 10,498,504 B2 | 12/2019 | Sang | |
| 11,025,333 B2 | 6/2021 | Kim | |
| 11,039,454 B2 | 6/2021 | Harada | |
| 11,044,739 B2 | 6/2021 | Li | |
| 11,088,750 B2 | 8/2021 | Zhou | |
| 11,122,454 B2 | 9/2021 | Kim | |
| 11,206,549 B1 | 12/2021 | Eyuboglu | |
| 11,228,974 B2 | 1/2022 | Park | |
| 11,895,509 B2 | 2/2024 | Xie | |
| 2011/0286399 A1 | 11/2011 | Chapman | |
| 2014/0023032 A1 | 1/2014 | Kim | |
| 2014/0241285 A1 | 8/2014 | Pang | |
| 2015/0029875 A1 | 1/2015 | Zhu | |
| 2015/0029879 A1 | 1/2015 | Chou | |
| 2015/0029910 A1 | 1/2015 | He | |
| 2015/0029918 A1 | 1/2015 | Bangolae | |
| 2015/0029936 A1 | 1/2015 | Johnsson | |
| 2015/0029955 A1 | 1/2015 | Heo | |
| 2015/0029956 A1 | 1/2015 | Moses | |
| 2015/0029957 A1 | 1/2015 | Han | |
| 2015/0031308 A1 | 1/2015 | Schmidt | |
| 2015/0245258 A1* | 8/2015 | Kim | H04W 48/18 |
| | | | 370/331 |
| 2015/0373572 A1 | 12/2015 | Sahin et al. | |
| 2016/0128006 A1 | 5/2016 | Ji et al. | |
| 2016/0142961 A1 | 5/2016 | Schmidt et al. | |
| 2016/0262077 A1 | 9/2016 | Zhang et al. | |
| 2016/0295597 A1 | 10/2016 | Franz et al. | |
| 2016/0374141 A1 | 12/2016 | He et al. | |
| 2017/0111830 A1 | 4/2017 | Schmidt et al. | |
| 2017/0171829 A1 | 6/2017 | Ji et al. | |
| 2017/0171830 A1 | 6/2017 | Ji et al. | |
| 2017/0188373 A1 | 6/2017 | He et al. | |
| 2018/0035361 A1 | 2/2018 | Ishii | |
| 2018/0172876 A1 | 6/2018 | Inanc et al. | |
| 2018/0219606 A1 | 8/2018 | Ng et al. | |
| 2018/0279181 A1 | 9/2018 | Hampel et al. | |
| 2018/0317263 A1 | 11/2018 | Ishii | |
| 2018/0338313 A1 | 11/2018 | He et al. | |
| 2018/0343631 A1 | 11/2018 | Ji et al. | |
| 2019/0053131 A1 | 2/2019 | Suzuki et al. | |
| 2019/0053271 A1 | 2/2019 | Islam | |
| 2019/0104507 A1 | 4/2019 | Majmundar et al. | |
| 2019/0104549 A1 | 4/2019 | Deng et al. | |
| 2019/0132882 A1 | 5/2019 | Li | |
| 2019/0223044 A1 | 7/2019 | Qin et al. | |
| 2019/0223073 A1 | 7/2019 | Chen et al. | |
| 2019/0230547 A1 | 7/2019 | Li et al. | |
| 2019/0268922 A1 | 8/2019 | He et al. | |
| 2019/0327641 A1 | 10/2019 | Mok et al. | |
| 2019/0335376 A1 | 10/2019 | Huang et al. | |
| 2019/0350005 A1 | 11/2019 | Liu | |
| 2019/0357267 A1 | 11/2019 | Martin | |
| 2019/0380071 A1 | 12/2019 | Liu | |
| 2020/0008244 A1 | 1/2020 | Suzuki | |
| 2020/0028560 A1 | 1/2020 | Gao et al. | |
| 2020/0045725 A1 | 2/2020 | Mochizuki et al. | |
| 2020/0120518 A1 | 4/2020 | Geng et al. | |
| 2020/0154321 A1 | 5/2020 | Kang et al. | |
| 2020/0163005 A1 | 5/2020 | Rao | |
| 2020/0205156 A1* | 6/2020 | Adjakple | H04W 72/0453 |
| 2020/0229054 A1 | 7/2020 | Lee | |
| 2020/0229244 A1 | 7/2020 | Yan | |
| 2020/0288451 A1 | 9/2020 | Lee et al. | |
| 2020/0305066 A1 | 9/2020 | Ishii | |
| 2020/0351955 A1* | 11/2020 | Jeon | H04W 76/27 |
| 2020/0359388 A1 | 11/2020 | He et al. | |
| 2020/0374921 A1 | 11/2020 | Li et al. | |
| 2020/0396744 A1* | 12/2020 | Xiong | H04B 7/088 |
| 2021/0068159 A1 | 3/2021 | Wu et al. | |
| 2021/0235505 A1 | 7/2021 | Hwang et al. | |
| 2021/0337449 A1 | 10/2021 | Zhu et al. | |
| 2021/0345199 A1 | 11/2021 | Liu | |
| 2021/0378028 A1 | 12/2021 | Wu | |
| 2022/0007247 A1 | 1/2022 | Yang | |
| 2022/0007254 A1 | 1/2022 | Da Silva et al. | |
| 2022/0007429 A1 | 1/2022 | Martin | |
| 2022/0022267 A1 | 1/2022 | Shi | |
| 2022/0132578 A1 | 4/2022 | Da Silva | |
| 2022/0191961 A1 | 6/2022 | Qiu et al. | |
| 2022/0217781 A1 | 7/2022 | Decarreau et al. | |
| 2022/0295361 A1 | 9/2022 | Naseer-Ul-Islam et al. | |
| 2022/0386197 A1 | 12/2022 | Hwang et al. | |
| 2022/0394583 A1 | 12/2022 | Deenoo et al. | |
| 2023/0052766 A1 | 2/2023 | Choe et al. | |
| 2023/0084632 A1 | 3/2023 | Xie | |
| 2023/0189095 A1 | 6/2023 | Da Silva | |
| 2023/0239752 A1 | 7/2023 | Balan et al. | |
| 2023/0239930 A1 | 7/2023 | Xie | |
| 2023/0328803 A1 | 10/2023 | Parichehrehteroujeni et al. | |

FOREIGN PATENT DOCUMENTS

| | | |
|---|---|---|
| CN | 101969662 A | 2/2011 |
| CN | 101990236 A | 3/2011 |
| CN | 102843706 A | 12/2012 |
| CN | 103096355 A | 5/2013 |
| CN | 101784122 B | 3/2014 |
| CN | 104349382 A | 2/2015 |
| CN | 104581983 A | 4/2015 |
| CN | 103096355 B | 11/2015 |
| CN | 106888507 A | 6/2017 |
| CN | 107645761 A | 1/2018 |
| CN | 107708151 A | 2/2018 |
| CN | 107733473 A | 2/2018 |
| CN | 107734598 A | 2/2018 |
| CN | 107820717 A | 3/2018 |
| CN | 107888259 A | 4/2018 |
| CN | 107888369 A | 4/2018 |
| CN | 107889141 A | 4/2018 |
| CN | 107889220 A | 4/2018 |
| CN | 108702698 A | 10/2018 |
| CN | 109246831 A | 1/2019 |
| CN | 109286942 A | 1/2019 |
| CN | 109600783 A | 4/2019 |
| CN | 109863814 A | 6/2019 |
| CN | 109983829 A | 7/2019 |
| CN | 110169189 A | 8/2019 |
| CN | 110192426 A | 8/2019 |
| CN | 110753324 A | 2/2020 |
| CN | 110798844 A | 2/2020 |
| CN | 110831079 A | 2/2020 |
| CN | 110913496 A | 3/2020 |
| CN | 111436159 A | 7/2020 |
| CN | 111819905 A | 10/2020 |
| CN | 112449386 A | 3/2021 |
| EP | 2698932 B1 | 8/2017 |
| EP | 3579649 B1 | 9/2021 |
| JP | 2015146645 A | 8/2015 |
| JP | 2022520389 A | 3/2022 |
| KR | 20190118626 A | 10/2019 |
| WO | 2012141483 A2 | 10/2012 |
| WO | 2014161268 A1 | 10/2014 |
| WO | 2014185139 A1 | 11/2014 |
| WO | 2018016799 A1 | 1/2018 |
| WO | 2018022570 A1 | 2/2018 |
| WO | 2018084201 A1 | 5/2018 |
| WO | 2018126417 A1 | 7/2018 |
| WO | 2018127549 A1 | 7/2018 |
| WO | 2018157298 A1 | 9/2018 |
| WO | 2018203716 A1 | 11/2018 |
| WO | 2019024545 A1 | 2/2019 |
| WO | 2019108114 A1 | 6/2019 |
| WO | 2019137453 A1 | 7/2019 |
| WO | 2019228298 A1 | 12/2019 |

(56) References Cited

FOREIGN PATENT DOCUMENTS

| WO | 2020052550 A1 | 3/2020 |
|---|---|---|
| WO | 2020164535 A1 | 8/2020 |
| WO | 2021062679 A1 | 4/2021 |
| WO | 2021067891 A1 | 4/2021 |

OTHER PUBLICATIONS

English translation of the Written Opinion of the International Search Authority in the international application No. PCT/CN2020/112850, mailed on Dec. 9, 2020. 3 pages.
3GPP. "3rd Generation Partnership Project; Technical Specification Group Radio Access Network; NR; Medium Access Control (MAC) Protocol Specification (Release 15)"3GPP TS 38.321 V 15.6.0, Jun. 30, 2019 (Jun. 30, 2019), entire document. 77 pages.
Qualcomm "Procedures for Two-Step RACH", R1-1907256,3GPP TSG-RAN WG1 Meeting #97, May 13-May 17, 2019. the whole document. 14 pages.
Qualcomm Incorporated: "2-step RACH fall back to 4-step RACH", 3GPP Draft; R2-1907910, XP051731327, May 13, 2019. pp. 1-3. 3 pages.
Supplementary Partial European Search Report in the European application No. 20861086.5, mailed on Sep. 12, 2022. 18 pages.
Huawei et al: "Fallbacks in two-step RACH", 3GPP Draft; R2-1910683, XP051768454, <Retrieved from the Internet: URL: http://www.3gpp.org/ftp/tsg_ran/WG2_RL2/TSGR2_107/Docs/R2-1910683.zip>, [retrieved on Aug. 16, 2019]. paragraphs [0002]-[04.1]. 6 pages.
Supplementary European Search Report in the European application No. 20861086.5, mailed on Dec. 19, 2022. 19 pages.
Samsung, "On Reporting Random Access-related Information", 3GPP TSG-RAN WG2 Meeting #107 R2-1909210, Aug. 26-30, 2019. the whole document. 3 pages.
Ericsson, "On the use cases and required F1 signaling for RACH optimization at gNB-DU", 3GPP TSG RAN WG3 #105 R3-194291, Aug. 26-30, 2019, the whole documents, 5 pages.
International Search Report in the international application No. PCT/CN2021/073117, mailed on Apr. 21, 2021. 2 pages.
Written Opinion of the International Search Authority in the international application No. PCT/CN2021/073117, mailed on Apr. 21, 2021. 5 pages.
Supplementary European Search Report in the European application No. 21750180.8, mailed on Jan. 5, 2023. 6 pages.
Ericsson, "Open issues related to RACH Report", 3GPP TSG RAN WG2 #108 R2-1915433, Oct. 18-Nov. 22, 2019, p. 1-9, 10 pages.
Samsung: "Further Logged Information in NR MDT", 3GPP Draft; R2-1916095, 3rd Generation Partnership Project (3GPP), Mobile Competence Centre ; 650, Route Des Lucioles ; F-06921 Sophia-Antipolis Cedex ; France vol. RAN WG2, No. Reno, USA; Nov. 18, 2019-Nov. 22, 2019, Nov. 18-22, 2019, XP051817644, the whole document, 7 pages.
3GPP TSG-RAN WG2 Meeting #108 R2-1915889, Reno, USA, Nov. 18-22, 2019, Title: Stage-2 running CR for 2-step RACH, Source to WG: Nokia (rapporteur), Nokia Shanghai Bell. the whole document. 8 pages.
International Search Report in the international application No. PCT/CN2021/101339, mailed on Sep. 9, 2021, 5 pages.
Written Opinion cited in PCT/CN2021/101339, mailed on Sep. 10, 2021, 10 pages.
3GPP TS 38.321 V16.0.0 (Mar. 2020), "3rd Generation Partnership Project; Technical Specification Group Radio Access Network; NR; Medium Access Control (MAC) protocol specification (Release 16)", https://portal.3gpp.org/desktopmodules/Specifications/SpecificationDetails.aspx?specificationId=3194, 140 pages.
CATT, "Corrections for the Content of RACH Records"3GPP TSG RAN WG2#109-e, R2-2000106, Electronic meeting, 24th Feb.-Mar. 6, 2020, pp. 1-3, 20 pages.
ZTE Corporation et al., "[Z152] Correction to RACH report and RLF report", 3GPP TSG RAN WG2#109bis-e, R2-2002923, Electronic meeting, Apr, 20-Apr. 30, 2020, the whole document, 19 pages.
CMCC: "2-step RACH optimisation", 3GPP Draft; R3-205437, 3rd Generation Partnership Project (3GPP), Mobile Competence Centre ; 650, Route Des Lucioles ; F-06921 Sophia-Antipolis Cedex ; France vol. Ran WG3, No. Online; Aug. 17, 2020-Aug. 28, 2020 Aug. 7, 2020 (Aug. 7, 2020), XP052398500, Section 2, 4 pages.
Supplementary European Search Report in the European application No. 21826467.9, mailed on Feb. 13, 2024, 22 pages.
Third Office Action of the European application No. 20861086.5, issued on Jun. 17, 2024. 5 pages.
ZTE Corporation et al.: "Further considerations on RACH optimization", 3GPP Draft; R2-2000805, 3rd Generation Partnership Project (3GPP), Mobile Competence Centre, 650, Route Des Lucioles; F-06921 Sophia-Antipolis Cedex; France, vol. RAN WG2, No. Electronic meeting; Feb. 24, 2020-Mar. 6, 2020 Feb. 14, 2020 (Feb. 14, 2020), XP051849335, Section 2. 7 pages.
Ericsson: "RACH report contents in NR Option 1", 3GPP Draft; R2-1910843, 3rd Generation Partnership Project (3GPP), Mobile Competence Centre; 650, Route Des Lucioles ; F-06921 Sophia-Antipolis Cedex; France, vol. RAN WG2, No. Prague, Czech Republic; Aug. 26, 2019-Aug. 30, 2019 Aug. 15, 2019 (Aug. 15, 2019), XP051768610, See Sections 5.7 and 6.2.2. 7 pages.
Supplementary Partial European Search Report in the European application No. 21826467.9, mailed on Oct. 20, 2023. 18 pages.
3GPP TSG-RAN WG2 #110e R2-2004733, Electronic meeting, Jun. 1- Jun. 11, 2020, Agenda Item: 6.12.4, Source: Ericsson, Title: Clarification to RA—report purposes, Document for: Discussion, Decision. the whole document. 12 pages.
International Search Report in the international application No. PCT/CN2019/097858, mailed on Oct. 29, 2019. 2 pages.
English translation of the Written Opinion of the International Search Authority in the international application No. PCT/CN2019/097858, mailed on Oct. 29, 2019. 3 pages.
Mediatek Inc: "Need of RLF Report in NR", 3GPP Draft; R2-1810042, 3rd Generation Partnership Project (3GPP), Mobile Competence Centre; 650, Route Des Lucioles; F-06921 Sophia-Antipolis Cedex; France, vol. RAN WG2, No. Montreal, Canada; Jul. 2, 2018-Jul. 6, 2018, Jul. 1, 2018 (Jul. 1, 2018) XP051467276, sections 2.2-2.3, 3 pages.
"3rd Generation Partnership Project; Technical Specification Group Radio Access Network; Evolved Universal Terrestrial Radio Access (E-UTRA); Radio Resource Control (RRC); Protocol specification (Release 15)", 3GPP Standard; Technical Specification; 3GPP TS 36.331, 3GPP, Mobile Competence Centre, 650, Route Des Lucioles; F-06921 Sophia-Antipolis Cedex; France, vol. RAN WG2, No. V15.2.2, Jul. 10, 2018 (Jul. 10, 2018), pp. 1-791, XP051474963, section 5.3.3.4 and whole section 5.6.5.
Supplementary European Search Report in the European application No. 19843529.9, mailed on Mar. 11, 2022. 20 pages.
Non Final Office Action of the U.S. Appl. No. 17/264,987, issued on Aug. 1, 2023. 32 pages.
Notice of Allowance of the U.S. Appl. No. 17/264,987, issued on Nov. 27, 2023. 17 pages.
Notice of Allowance of the U.S. Appl. No. 17/264,987, issued on Dec. 6, 2023. 5 pages.
International Search Report in the international application No. PCT/CN2019/085110, mailed on Jul. 19, 2019. 2 pages.
English translation of the Written Opinion of the International Search Authority in the international application No. PCT/CN2019/085110, mailed on Jul. 19, 2019. 4 pages.
AT&T: "Beam Management Framework for Initial Access UE", 3GPP Draft; R1-1704341 Beam Managementframework for Initial Access UE, 3rd Generation Partnership Project (3GPP), Mobile Competence Centre; 650, Route Deslucioles; F-06921 Sophia-Antipolis Cedex; vol. RAN WG1, No. Spokane, Washington, USA, Apr. 3, 2017-Apr. 7, 2017, Apr. 2, 2017 (Apr. 2, 2017), XP051242492, paragraphs [0001]-[0002], 3 pages.
Samsung: "DL beam management RS for multi-beam > 6GHZ NR system", 3GPP Draft; R1-1612495, 3rd Generation Partnership Project (3GPP), Mobile Competence Centre; 650, Route Des Lucioles;

(56) References Cited

OTHER PUBLICATIONS

F-06921 Sophia-Antipolis Cedex; France vol. RAN WG1, No. Reno, USA; Nov. 14, 2016-Nov. 18, 2016 Nov. 13, 2016 (Nov. 13, 2016), XP051176442, paragraph [0003], 5 pages.
Qualcomm Incorporated: "Discussion of beam level measurements reporting in logged MDT in NR", 3GPP Draft; R2-1903072-DISCUSSION of Beam Level Measurements Reporting in Logged MDT in NR, 3rd Generation Partnership Project (3GPP), Mobile Competence Centre; 650, Route Des Lucioles; F-06921 so vol. RAN WG2, No. Xi' an, China; Apr. 8, 2019-Apr. 12, 2019, Apr. 6, 2019 (Apr. 6, 2019), XP051700429, paragraphs [0001]-[0003], 4 pages.
CMCC: "New Measurements for NR MDT", 3GPP Draft; R2-1901957-NEW Measurements for NR MDT, 3rd Generation Partnership Project (3GPP), Mobile Competence Centre; 650, Route Des Lucioles; F-06921 Sophia-Antipolis Cedex; France, vol. RAN WG2, No. Athens, Greece; Feb. 25, 2019-Mar. 1, 2019, Feb. 15, 2019 (Feb. 15, 2019), XP051603305, paragraphs [0001]-[0003], 4 pages.
Huawei et al: "Allocation of appropriate RACH resources for handover", 3GPP Draft; R2-1708883 Allocation of Appropriate RACH Resources for Handover, RD Generation Partnership Project (3GPP), Mobile Competence Centre; 650, Route Des Lucioles; F-06921 Sophia-Antipolis C, vol. RAN WG2, No. Berlin, Germany; Aug. 21, 2017-Aug. 25, 2017, Aug. 20, 2017 (Aug. 20, 2017), XP051318684, pp. 1-6; figure 1.
Samsung: "Beam Selection for HO Access", 3GPP Draft; R2-1710082_BEAM Selection for HO Access, 3rd Generation Partnership Project (3GPP), Mobile Competence Centre; 650, Route Des Lucioles; F-06921 Sophia-Antipolis Cedex, France, vol. RAN WG2, No. Prague, Czech Republic; Oct. 9, 2017-Oct. 13, 2017, Sep. 29, 2017 (Sep. 29, 2017), XP051354740, paragraphs [0001]-[02.1], 4 pages.
Supplementary European Search Report in the European application No. 19796357.2, mailed on Sep. 19, 2022 24 pages.
Requirement for Restriction of the U.S. Appl. No. 17/052,840, issued on Sep. 15, 2022. 7 pages.
Non Final Office Action of the U.S. Appl. No. 17/052,840, issued on Dec. 30, 2022. 37 pages.
Final Office Action of the U.S. Appl. No. 17/052,840, issued on May 25, 2023. 90 pages.
Notice of Allowance of the U.S. Appl. No. 17/052,840, issued on Aug. 15, 2023. 37 pages.
International Search Report in the international application No. PCT/CN2021/099137, mailed on Aug. 27, 2021. 2 pages.
English translation of the Written Opinion of the International Search Authority in the international application No. PCT/CN2021/099137, mailed on Aug. 27, 2021. 3 pages.
CATT. "stage-3 CR for Conditional PSCell Change for intra-SN without MN involvement" 3GPP TSG-RAN WG2 Meeting #109 electronic R2-2001043, Mar. 6, 2020 (Mar. 6, 2020), 34 pages.
Huawei et al. "Discussion on conditional PSCell addition/change requirements" 3GPP TSG-RAN WG4 Meeting #94-e R4-2001574, Mar. 6, 2020 (Mar. 6, 2020), 3 pages.
Huawei et al: "Further discussion on Conditional HO", 3GPP Draft, R2-1802472 Further Discussion on Conditional HO, 3rd Generation Competence Centre; 650, Route Des Lucioles F-06921 Sophia-Antipolis Cedex; France Partnership Project (3GPP), Mobile vol. RAN WG2, No. Athens, GR, Feb. 26, 2018-Mar. 2, 2018 Feb. 16, 2018 (Feb. 16, 2018), XP051400150, Paragraph "2.1 Condition Handover", 3 pages.
Ericsson: "Conditional PSCell addition/change", 3GPP Draft; R2-1914637, 3rd Generation Partnership Project (3GPP), Mobile Competence Centre; 650, Route Des Lucioles; F-06921 Sophia-Antipolis Cedex; France, vol. RAN WG2, No. Reno, Nevada, USA; Nov. 18, 2019-Nov. 22, 2019 Nov. 7, 2019 (Nov. 7, 2019), XP051815696, Paragraph "2.2 Coexistence of CHO and Conditional PSCell addition/change", 11 pages.
CATT: "Discussion on Signaling Structure of CHO Configuration Message", 3GPP Draft; R2-1912136, 3rd Generation Partnership Project (3GPP), Mobile Competence Centre; 650, Route Des Lucioles F-06921 Sophia-Antipolis Cedex; France, vol. RAN WG2, No. Chongqing, P.R. China; Oct. 14, 2019-Oct. 18, 2019 Oct. 3, 2019 (Oct. 3, 2019), XP051803751, Paragraph "2. Discussion", 11 pages.
Supplementary European Search Report in the European application No. 21821970.7, mailed on Jun. 7, 2024. 13 pages.
Ericsson, Other aspects of CHO, 6.9.3.3 Conditional handover—other aspects, 3GPP TSG-RAN WG2 #109-e, Tdoc R2-2000332, Electronic meeting, Feb. 24-Mar. 6, 2020, pp. 1-3.
CMCC (Moderator), Email discussion on Rel-17 RAN-centric data collection and utilization enhancement, 3GPP TSG-RAN meeting #86, RP-192603, 911—Dec. 12, 2019, Sitges, Barcelona, pp. 1-36.
ZTE Corporation, Sanechips, "CHO triggering configuration", 3GPP TSG RAN WG2 Meeting #109e, R2-2001258 (revision of R2-1914813), Feb. 24-Mar. 6, 2020, Online, pp. 1-5.
Jiang Jie, "Analysis and Application of Switching Events in LTE Network Switching", Digital Communications World, vol. 11, Nov. 1, 2018, 4 pages.
Non Final Office Action of the U.S. Appl. No. 17/760,147, issued on Sep. 20, 2024. 47 pages.
Partial Supplementary European Search Report in the European application No. 19796357.2, mailed on Jun. 1, 2022. 20 pages.
Final Office Action of the U.S. Appl. No. 17/760,147, issued on Apr. 17, 2025. 33 pages.
Non Final Office Action of the U.S. Appl. No. 17/928,364, issued on Mar. 20, 2025. 36 pages.

\* cited by examiner

INFORMATION SENDING METHOD, INFORMATION RECEIVING METHOD AND DEVICE

CROSS-REFERENCE TO RELATED APPLICATION

The present application is based on and claims priority to Chinese Patent Application No. 202010568297.7 filed on Jun. 19, 2020, the content of which is hereby incorporated by reference in its entirety.

TECHNICAL FIELD

The present disclosure relates to the technical field of mobile communication, and in particular to a method for transmitting information, a method for receiving information and a device.

BACKGROUND

For a User Equipment (UE) and a base station operating in an unlicensed band, Listen Before Talk (LBT) operation is performed before each data transmission. If it is monitored that the channel is busy, the monitoring is performed after backing off for a period of time. The channel is considered idle until it is idle for a period of time, and then the data is transmitted. In order to reduce a delay of random access, steps of a 4-step Random Access (RA) mechanism in the related art may be reduced to 2 steps, thereby reducing a number of times of performing the LBT and reducing the delay of the random access. FIG. 1 and FIG. 2 illustrate diagrams of a competition-based 4-step RA process and a competition-based 2-step RA process in the related art, respectively. It can be seen that a message A (msg A) and a message (msg B) are transmitted in the 2-step RA process, which can reduce a number of interactions between the base station and the UE.

Due to advantages of the 2-step RA, such as fewer steps and short delay, application scenario thereof is extended to a licensed band. That is, the 2-step RA process is accessible to both the unlicensed band and the licensed band. However, when initiating the 2-step RA, the UE is usually not connected to a network, or the connection is temporarily interrupted. At this time, the network side is not aware of information such as a state of the UE when initiating the random access, and it is thus difficult to reasonably configure random access related parameters.

SUMMARY

At least one embodiment of the present disclosure provides a method for transmitting information, a User Equipment (UE) and a network device.

According to an aspect of the present disclosure, at least one embodiment provides a method for transmitting information, which includes the following operations.

A User Equipment (UE) records 2-step Random Access (RA) related information.

The UE transmits the 2-step RA related information to a network.

In the embodiment, the 2-step RA related information includes at least one of the following:

A UE state when the UE initiates a 2-step RA;

A scenario where the UE initiates the 2-step RA;

Information of a Physical Uplink Shared Channel (PUSCH) resource for a message A (msg A) configured by the network to the UE;

Whether a quality of a reference signal is higher than a threshold configured by the network when the UE initiates the 2-step RA;

Whether the 2-step RA and a 4-step RA initiated by the UE share random access resources;

Resource information of the shared random access resources when the 2-step RA and the 4-step RA initiated by the UE share the random access resources;

A number of Synchronization Signal and PBCH Blocks (SSBs) of the 2-step RA mapped to each Physical Random Access Channel (PRACH) occasion;

Transmission parameters of the msg A transmitted when the UE initiates the 2-step RA, the transmission parameters including at least one of a frequency-domain starting position, a subcarrier spacing, a number of msg A PRACH transmission occasions frequency-division multiplexed in one time instance (msgA-RO-FDM), a maximum number of the msg A transmitted before switching to the 4-step RA, a PRACH configuration index of the msg A (msgA-PRACH-ConfigurationIndex) and a frequency offset of a lowest point in a frequency-domain of PRACH transmission occasions relative to a Physical Resource Block number 0 (PRB0) (msgA-RO-FrequencyStart);

Whether the UE is configured with a PRACH root sequence or a PRACH root sequence index of the msg A;

Whether a ra-Prioritization field is applied to access identities;

A maximum number of preambles allowed to be transmitted before declaring failure; or A length of a time window for receiving a message B (msg B) configured by the network side.

In the embodiment, the reference signal includes an SSB and a Channel State Information-Reference Signal (CSI-RS), and the threshold configured by the network is a Reference Signal Received Power (RSRP) threshold of an SSB corresponding to random access resources for transmitting the msg A (msgA-RSRP-ThresholdSSB), an RSRP threshold of an Supplementary Uplink (SUL) of the SSB corresponding to the random access resources for transmitting the msg A (msgA-RSRP-ThresholdSSB-SUL), an RSRP threshold of a CSI-RS corresponding to the random access resources for transmitting the msg A (msgA-RSRP-ThresholdCSI-RS), or an RSRP threshold of an SUL of the CSI-RS corresponding to the random access resources for transmitting the msg A (msgA-RSRP-ThresholdCSI-RS-SUL).

In the embodiment, the operation that the UE transmits the 2-step RA related information to the network includes the following operations.

The UE transmits the 2-step RA related information when the UE is in an idle state or in an inactive state or in a connected state or in a process of switching to the connected state.

In the embodiment, the 2-step RA related information is transmitted through a random access report or a predefined message.

In the embodiment, the operation that the UE transmits the 2-step RA related information includes the following operations.

The UE actively transmits the 2-step RA related information to the network, or the UE transmits the 2-step RA related information to the network after receiving a request message from the network.

In the embodiment, before the request message from the network is received, the method further includes the following operations.

The UE transmits indication information of a 2-step RA related log recorded by the UE to the network.

In the embodiment, before the operation that the UE records the 2-step RA related information, the method may further include the following operations.

Configuration information from the network is received, and the 2-step RA related information to be recorded by the UE is configured according to the configuration information.

In an embodiment, the 2-step RA related information to be recorded by the UE is configured according to local pre-stored information.

According to another aspect of the present disclosure, at least one embodiment provides a method for receiving information, which includes the following operations.

A network-side device receives 2-step RA related information from a UE.

In the embodiment, the 2-step RA related information includes at least one of the following:

A UE state when the UE initiates a 2-step RA;

A scenario where the UE initiates the 2-step RA;

Information of a PUSCH resource for a msg A configured by the network to the UE;

Whether a quality of a reference signal is higher than a threshold configured by the network when the UE initiates the 2-step RA;

Whether the 2-step RA and a 4-step RA initiated by the UE share random access resources;

Resource information of the shared random access resources when the 2-step RA and the 4-step RA initiated by the UE share the random access resources;

A number of SSBs of the 2-step RA mapped to each PRACH occasion;

Transmission parameters of the msg A transmitted when the UE initiates the 2-step RA, the transmission parameters including at least one of a frequency-domain starting position, a subcarrier spacing, a number of msgA-RO-FDM, a maximum number of the msg A transmitted before switching to the 4-step RA, a msgA-PRACH-ConfigurationIndex and a msgA-RO-FrequencyStart;

Whether the UE is configured with a PRACH root sequence or a PRACH root sequence index of the msg A;

Whether a ra-Prioritization field is applied to access identities;

A maximum number of preambles allowed to be transmitted before declaring failure; or A length of a time window for receiving a msg B configured by the network In the embodiment, before the 2-step RA related information from the UE is received, the method further includes the following operations.

Configuration information is transmitted to the UE to configure the 2-step RA related information to be recorded by the UE.

In the embodiment, the 2-step RA related information is transmitted through a random access report or a predefined message.

In the embodiment, the operation that the 2-step RA related information from the UE is received includes the following operations.

The 2-step RA related information actively transmitted by the UE is received. In an embodiment, a request message is transmitted to the UE, and the 2-step RA related information transmitted by the UE according to the request message is received.

In the embodiment, before the request message is transmitted to the UE, the method further includes the following operation.

Indication information of a 2-step RA related log recorded by the UE is received from the UE.

In the embodiment, after the 2-step RA related information from the UE is received, the method further includes the following operations.

Network coverage and random access procedure parameters are optimized according to the 2-step RA related information.

According to another aspect of the present disclosure, at least one embodiment provides a UE, which includes a recording module and a transmitting module.

The recording module is configured to record 2-step RA related information.

The transmitting module is configured to transmit the 2-step RA related information to a network.

In the embodiment, the 2-step RA related information includes at least one of the following:

A UE state when the UE initiates a 2-step RA;

A scenario where the UE initiates the 2-step RA;

Information of a PUSCH resource for a msg A configured by the network to the UE;

Whether a quality of a reference signal is higher than a threshold configured by the network when the UE initiates the 2-step RA;

Whether the 2-step RA and a 4-step RA initiated by the UE share random access resources;

Resource information of the shared random access resources when the 2-step RA and the 4-step RA initiated by the UE share the random access resources;

A number of SSBs of the 2-step RA mapped to each PRACH occasion;

Transmission parameters of the msg A transmitted when the UE initiates the 2-step RA, the transmission parameters including at least one of a frequency-domain starting position, a subcarrier spacing, a number of msgA-RO-FDM, a maximum number of the msg A transmitted before switching to the 4-step RA, a msgA-PRACH-ConfigurationIndex and a msgA-RO-FrequencyStart;

Whether the UE is configured with a PRACH root sequence or a PRACH root sequence index of the msg A;

Whether a ra-Prioritization field is applied to access identities;

A maximum number of preambles allowed to be transmitted before declaring failure; or A length of a time window for receiving a msg B configured by the network side.

In the embodiment, the UE further includes a configuration module.

The configuration module is configured to receive configuration information from the network, and configure the 2-step RA related information to be recorded by the UE according to the configuration information. In an embodiment, the configuration module is configured to configure the 2-step RA related information to be recorded by the UE according to local pre-stored information.

According to another aspect of the present disclosure, at least one embodiment provides a UE, which includes a transceiver and a processor.

The processor is configured to record 2-step RA related information.

The transceiver is configured to enable the UE to transmit the 2-step RA related information to a network.

In the embodiment, the 2-step RA related information includes at least one of the following:

A UE state when the UE initiates a 2-step RA;

A scenario where the UE initiates the 2-step RA;

Information of a PUSCH resource for a msg A configured by the network to

Whether a quality of a reference signal is higher than a threshold configured by the network when the UE initiates the 2-step RA;

Whether the 2-step RA and a 4-step RA initiated by the UE share random access resources;

Resource information of the shared random access resources when the 2-step RA and the 4-step RA initiated by the UE share the random access resources;

A number of SSBs of the 2-step RA mapped to each PRACH occasion;

Transmission parameters of the msg A transmitted when the UE initiates the 2-step RA, the transmission parameters including at least one of a frequency-domain starting position, a subcarrier spacing, a number of msgA-RO-FDM, a maximum number of the msg A transmitted before switching to the 4-step RA, a msgA-PRACH-ConfigurationIndex and a msgA-RO-FrequencyStart;

Whether the UE is configured with a PRACH root sequence or a PRACH root sequence index of the msg A;

Whether a ra-Prioritization field is applied to access identities;

A maximum number of preambles allowed to be transmitted before declaring failure; or A length of a time window for receiving a msg B configured by the network side.

According to another aspect of the present embodiment, at least one embodiment provides a UE, which includes a processor, a memory and programs stored on the memory and being capable of running on the processor. The programs, when executed by the processor, implement the operations of any of the above methods for transmitting information.

According to another aspect of the present disclosure, at least one embodiment provides a network-side device, which includes a receiving module.

The receiving module is configured to receive 2-step RA related information from a UE.

In the embodiment, the 2-step RA related information includes at least one of the following:

A UE state when the UE initiates a 2-step RA;

A scenario where the UE initiates the 2-step RA;

Information of a PUSCH resource for a msg A configured by the network to the UE;

Whether a quality of a reference signal is higher than a threshold configured by the network when the UE initiates the 2-step RA;

Whether the 2-step RA and a 4-step RA initiated by the UE share random access resources;

Resource information of the shared random access resources when the 2-step RA and the 4-step RA initiated by the UE share the random access resources;

A number of SSBs of the 2-step RA mapped to each PRACH occasion;

Transmission parameters of the msg A transmitted when the UE initiates the 2-step RA, the transmission parameters including at least one of a frequency-domain starting position, a subcarrier spacing, a number of msgA-RO-FDM, a maximum number of the msg A transmitted before switching to the 4-step RA, a msgA-PRACH-ConfigurationIndex and a msgA-RO-FrequencyStart;

Whether the UE is configured with a PRACH root sequence or a PRACH root sequence index of the msg A;

Whether a ra-Prioritization field is applied to access identities;

A maximum number of preambles allowed to be transmitted before declaring failure; or A length of a time window for receiving a msg B configured by the network side.

According to another aspect of the present disclosure, at least one embodiment provides a network-side device, which includes a transceiver and a processor.

The transceiver is configured to receive 2-step RA related information from a UE.

According to another aspect of the present disclosure, at least one embodiment provides a network-side device, which includes a processor, a memory, and programs stored on the memory and being capable of running on the processor. The programs, when executed by the processor, implement the operations of any of the above methods for transmitting information.

According to another aspect, at least one embodiment provides a computer-readable storage medium. Programs are stored on the computer-readable storage medium. The programs, when executed by the processor, implement the operations of any of the above methods.

According to the method for transmitting information, the method for receiving information and the device provided by the embodiments of the present disclosure, a UE records 2-step RA related information, and transmits the information to a network, so that the network side can be informed of the 2-step RA related information, thereby providing reference information for the network side to optimize configuration of related parameters. Thus, reporting the 2-step RA related information to the network side can help the network to optimize network coverage and random access procedure parameters according to the above information, thereby improving communication performance of the system. For example, when it is determined that a number of UEs with access failures in a certain period of time is too large according to the random access related information, frequency-domain position, preamble sequence, and the like of the random access can be reconfigured, which facilitates configuration of reasonable random access parameters for the UE by the network side, improves a success rate of the random access of the UE, and further improves the communication performance of the system.

BRIEF DESCRIPTION OF THE DRAWINGS

Various other advantages and benefits would become apparent to those of ordinary skill in the art upon reading the following detailed description of the embodiments of the present disclosure. The drawings are only for purposes of illustrating embodiments of the present disclosure and are not to be construed as limiting the present disclosure. Also, throughout the drawings, the same components are represented by the same reference symbols. In the drawings.

DETAILED DESCRIPTION

Figure 1:
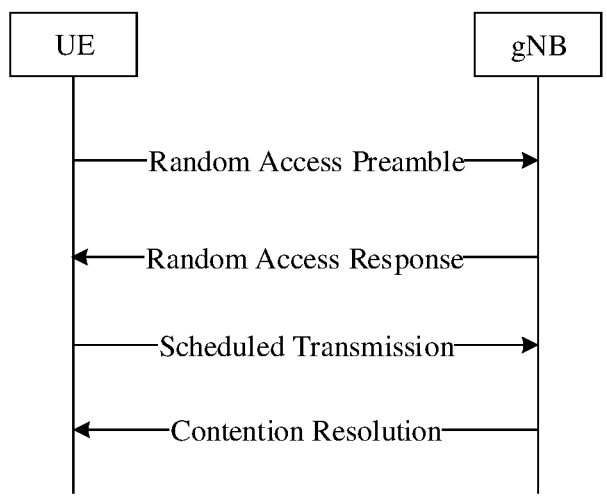
FIG. 1 is a diagram of a competition-based 4-step RA process in the related art.
Figure 2:
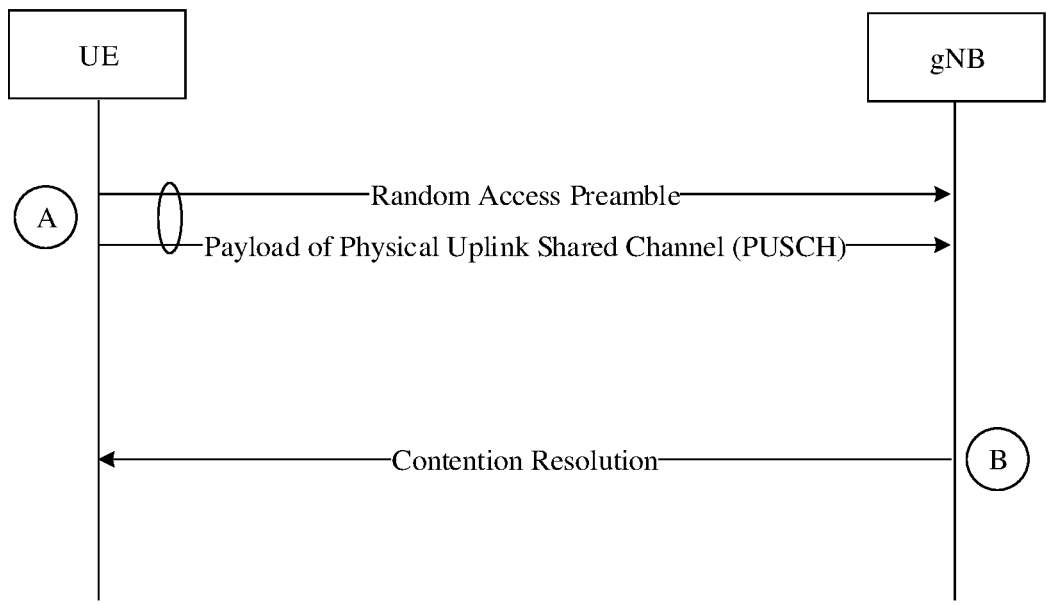
FIG. 2 is a diagram of a competition-based 2-step RA process in the related art.

Exemplary embodiments of the present application will be described below more comprehensively with reference to the drawings. While the exemplary embodiments of the present application are shown in the drawings, it is to be understood that the present disclosure may be embodied in various forms and should not be limited to the embodiments set forth herein. Rather, these embodiments are provided so that the present application will be understood more thoroughly, and the scope of the present disclosure can be fully conveyed to those skilled in the art.

Terms "first", "second", etc., in the description and claims of the present disclosure are adopted not to describe a specific sequence or order but to distinguish similar objects. It is to be understood that data used like this may be interchanged as appropriate such that the embodiments of the present disclosure described here may be implemented, for example, according to sequences in addition to those illustrated or described here. In addition, terms "comprise", "has" or any other variations thereof are intended to cover a non-exclusive inclusion. For example, a process, method, system, product or device that includes a list of steps or units is not necessarily limited to only those steps or units but may include other steps or units not expressly listed or inherent to such process, method, product or device. "And/or" in the description and the claims means at least one of the connected objects.

Technologies described herein are not limited to a New Radio (NR) system and Long Time Evolution (LTE)/LTE-Advanced (LTE-A) systems, and may also be used in various wireless communication systems, such as Code Division Multiple Access (CDMA), Time Division Multiple Access (TDMA), Frequency Division Multiple Access (FDMA), Orthogonal Frequency Division Multiple Access (OFDMA), Single-Carrier Frequency-Division Multiple Access (SC-FDMA), and other systems. The terms "system" and "network" are often used interchangeably. The CDMA system may implement radio technologies such as CDMA2000 or Universal Terrestrial Radio Access (UTRA). The UTRA includes Wideband Code Division Multiple Access (WCDMA) and other CDMA variants. The TDMA system may implement radio technologies such as Global System for Mobile Communication (GSM). The OFDMA system may implement radio technologies such as Ultra Mobile Broadband (UMB), Evolution-UTRA (E-UTRA), IEEE 802.11 (Wi-Fi), IEEE 802.16 (WiMAX), IEEE 802.20, and Flash-OFDM. The UTRA and the E-UTRA are part of a Universal Mobile Telecommunications System (UMTS). The LTE and higher-level LTE, such as the LTE-A, are new releases of the UMTS that use the E-UTRA. The UTRA, the E-UTRA, the UMTS, the LTE, the LTE-A, and the GSM are described in documents from an organization named 3rd Generation Partnership Project (3GPP). CDMA2000 and UMB are described in documents from an organization named 3rd Generation Partnership Project 2 (3GPP2). The technologies described herein in the embodiments of the present disclosure may be used for both the above-mentioned systems and radio technologies, as well as for other systems and radio technologies. However, the following description describes the NR systems for purposes of example, and NR terms are used in most of the following description, although these technologies are also applicable to applications other than NR system applications.

The following description provides examples and does not limit the scope, applicability, or configuration set forth in the claims. Changes may be made in the function and arrangement of elements discussed without departing from the spirit and scope of the present disclosure. Various examples may omit, replace, or add various procedures or components as appropriate. For example, the described methods may be performed in an order other than that described, and various steps may be added, omitted, or combined. In addition, features described with reference to certain examples may be combined in other examples.

Figure 3:
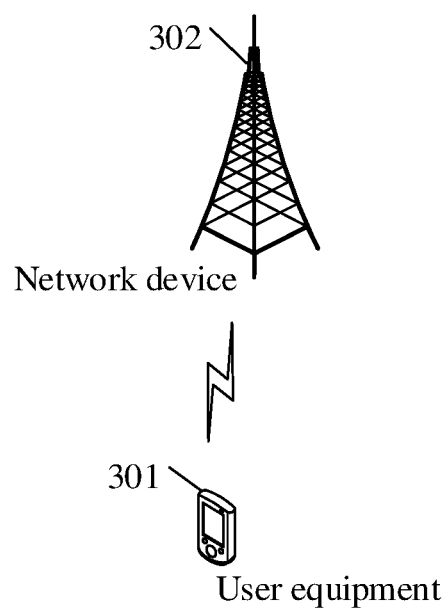
FIG. 3 is a diagram of an application scenario according to an embodiment of the present disclosure.

FIG. 3 shows a block diagram of a wireless communication system to which embodiments of the present disclosure may be applied. The wireless communication system includes a terminal 301 and a network device 302. The terminal 301 may also be referred to as a user terminal or a UE. The UE 301 may be a cell phone, a Tablet Personal Computer, a Laptop Computer, a Personal Digital Assistant (PDA), a Mobile Internet Device (MID), a Wearable Device (Wearable Device) or a terminal-side device such as a vehicle-mounted device. It is to be noted that the specific type of the UE 301 is not limited in the embodiments of the present disclosure. The network device 302 may be a base station and/or a core network element. The base station may be base stations in 5G and advanced releases such as a next Generation Node B (gNB), a fifth-generation New Radio Node B (5G NR NB), and the like, or may be base stations in other communication systems such as Evolved Node B (eNB), Wireless Local Area Network (WLAN) access points or other access points. The base station may be referred to as a node B, an eNB, an access point, a Base Transceiver Station (BTS), a radio base station, a radio transceiver, a Basic Service Set (BSS), an Extended Service Set (ESS), a node B, an eNB, a home node B, a home eNB, a WLAN access point, a Wi-Fi node, or some other suitable terms in the art. The base station is not limited to a particular technical term as long as the same technical effect is achieved. It is to be noted that only the base station in the NR system is taken as an example in the embodiments of the present disclosure. However, the specific type of the base station is not limited.

The base station may communicate with the UE 301 under control of a base station controller. In various embodiments, the base station controller may be part of a core network or some base stations. Some base stations may communicate control information or user data with the core network via backhaul. In some examples, some of these base stations may communicate with each other directly or indirectly through backhaul links, which may be wired or wireless communication links. The wireless communication system may support operations on multiple carriers (waveform signals of different frequencies). A multi-carrier transmitter may simultaneously transmit modulated signals over the multiple carriers. For example, each communication link may be a multi-carrier signal modulated according to various radio technologies. Each modulated signal may be transmitted over different carriers and may carry control information (e.g., reference signals, control channels, etc.), overhead information, data, etc.

The base station may communicate wirelessly with the UE 301 via one or more access point antennas. Each base station may provide communication coverage for a respective corresponding coverage area. A coverage area of an access point may be divided into sectors that form only a portion of the coverage area. The wireless communication system may include different types of base stations (e.g., macro base stations, micro base stations, or pico base stations). The base stations may also utilize different radio technologies, such as cellular or WLAN radio access technologies. The base stations may be associated with the same or different access networks or operator deployments. Coverage areas of different base stations (including coverage areas of the same or different types of base stations, coverage areas utilizing the same or different radio technologies, or coverage areas belonging to the same or different access networks) may overlap.

The communication link in the wireless communication system may include an Uplink (UL) for carrying UL transmission (e.g., from the UE 301 to the network device 302), or a Downlink (DL) for carrying DL transmission (e.g., from the network device 302 to the UE 301). The UL transmission may also be referred to as reverse link transmission, and the DL transmission may also be referred to as forward link transmission. The DL transmission may be performed using a licensed band, an unlicensed band, or both. Similarly, the UL transmission may be performed using a licensed band, an unlicensed band, or both.

In the related art, 2-step RA is accessible to both the unlicensed band and the licensed band. Usually, when initiating 2-step RA, the UE is not connected to the network, or the connection is temporarily interrupted, so the network side is not aware of performance of random access of the UE, and it is thus difficult to reasonably configure random access related parameters. The UE records the random access related information and reports the random access related information to the network, which may assist the network side in configuring reasonable 2-step RA parameters in a corresponding application scenario.

For example, for the UE in an idle state or inactive state, the 2-step RA process and reported content thereof are consistent. If the content and size of a transmitted msg A are inconsistent, the network side may determine whether the 2-step RA is initiated by the UE from the idle state or from the inactive state, thus helping the network to perform a one-step optimization access process. For example, a resume process of the inactive UE usually needs to be completed quickly, and the network side may especially optimize the 2-step RA process of the resume process with limited resources. In addition, some 2-step Random Access Channel (RACH) shares resources with the 4-step RACH, and the network side may determine whether to continue the sharing and an extent of the sharing according to the information reported by the UE.

To solve at least one of the above problems, embodiments of the present disclosure provide a method for transmitting information. The UE records and reports the related information in the 2-step RA process, which may help the network side to configure reasonable random access related parameters and improve the performance of the communication system.

Figure 4:
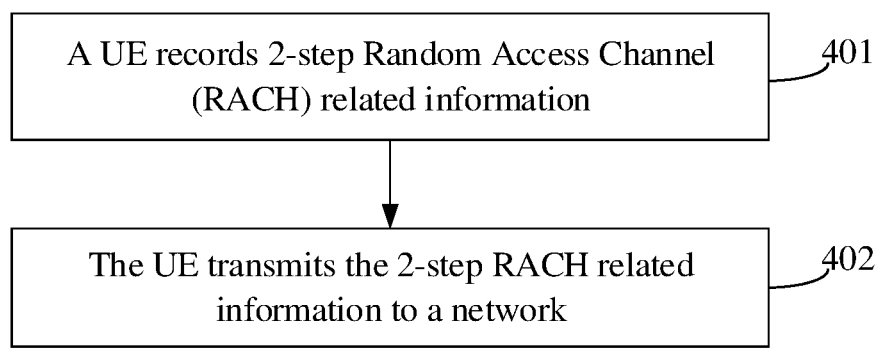
FIG. 4 is a flowchart of a method for transmitting information applied to a UE side according to an embodiment of the present disclosure.

Referring to FIG. 4, the method for transmitting information provided by the embodiments of the present disclosure, when applied to the UE side, includes the following operations.

At S401, a UE records 2-step RA related information.

At S402, the UE transmits the 2-step RA related information to a network.

Here, the UE may transmit the 2-step RA related information when the UE is in an idle state or in an inactive state or in a connected state or in a process of switching to a connected state. Specifically, the 2-step RA related information may be transmitted through a random access report or a predefined message.

Through the above steps, in the embodiment of the present disclosure, the UE records the 2-step RA related information, and transmits the above information to the network, so that the network can obtain the 2-step RA related information, so as to help the network side to optimize the configuration of related parameters according to the above information, thereby improving the communication performance of the system.

Herein, the 2-step RA related information may include at least one as follows.

a) A UE state when the UE initiates a 2-step RA.

Here, the UE state may include an idle state, an inactive state or a connected state, etc.

b) A scenario where the UE initiates the 2-step RA.

Here, the scenario of initiating 2-step RA may specifically include a Radio Resource Control (RRC) connection establishment request (i.e., the 2-step RA is initiated since the UE needs to establish an RRC connection), a connection resume request (the RRC connection establishment request and the connection resume request are collectively referred to as accessRelated), or random access caused by conditional handover, etc. Herein, when the scenario is the RRC connection establishment request, it may be further recorded whether the RRC connection establishment request is an initial connection establishment request initiated by the UE, or a connection re-establishment request initiated after Radio Link Failure (RLF) or check failure or compliance check failure, or a random access procedure due to cell selection.

c) Information of a PUSCH resource (e.g., size and/or position of the resource) for a msg A configured by the network side to the UE. In addition, a size of the msg A transmitted when the UE initiates the 2-step RA, a payload size of the msg A or PUSCH (i.e., size of an overall payload available in a UE buffer at a time of initiating the 2-step RA), a padding size of the msg A or PUSCH, etc. may also be included here.

d) Whether a quality of a reference signal is higher than a threshold configured by the network when the UE initiates the 2-step RA.

Here, the reference signal may include a SSB and a CSI-RS. The threshold configured by the network is a msgA-RSRP-ThresholdSSB, a msgA-RSRP-Threshold-SSB-SUL, a msgA-RSRP-ThresholdCSI-RS, or a msgA-RSRP-ThresholdCSI-RS-SUL, etc.

e) Whether the 2-step RA and a 4-step RA initiated by the UE share random access resources.

f) Resource information of the shared random access resources when the 2-step RA and the 4-step RA initiated by the UE share the random access resources.

Here, whether the 2-step RA and the 4-step RA initiated by the UE share random access resources may include whether the random access resources used when the UE initiates the 2-step RA (which may specifically include RA Occasions (RO) in a PRACH occasion, preambles, etc.) are shared with the 4-step RA. The specific shared random access resources may include ROs or preambles, and the like shared on each SSB.

g) A number of SSBs of the 2-step RA mapped to each PRACH occasion.

h) Transmission parameters of the msg A transmitted when the UE initiates the 2-step RA. The transmission parameters include at least one of a frequency-domain starting position, a subcarrier spacing (when the UE is only configured with a Bandwidth Part (BWP) of the 2-step RA), a number of msgA-RO-FDM, a maximum number of the msg A transmitted before switching to the 4-step RA, a msgA-PRCH-ConfigurationIndex and a msgA-RO-FrequencyStart.

i) Whether the UE is configured with a PRACH root sequence of the msg A or a PRACH root sequence index of the msg A (i.e., msgA-PRACH-RootSequenceIndex).

j) Whether a ra-Prioritization field is applied to access identities.

k) A maximum number of preambles allowed to be transmitted before declaring failure. For example, the maximum number of preambles allowed to be transmitted before declaring that the random access fails.

l) A length of a time window for receiving a msg B configured by the network

According to at least one embodiment of the present disclosure, at S402, the operation that the UE transmits the 2-step RA related information may specifically include that the UE actively transmits the 2-step RA related information to the network. For example, the UE transmits the information to the network according to a preset time cycle or when locally recorded information reaches a preset number.

According to at least one embodiment of the present disclosure, at S402, the operation that the UE transmits the 2-step RA related information may further include that the UE transmits the 2-step RA related information to the network in response to a request message after receiving the request message from the network.

In an embodiment, before the request message from the network is received, the UE may transmit indication information of a 2-step RA related log recorded by the UE to the network. For example, the indication information of the 2-step RA related log is transmitted to the network when the locally recorded 2-step RA related information meets a preset condition. The network may decide whether to transmit the request message to the UE according to the indication information, so as to obtain the 2-step RA related information recorded by the UE. The preset condition may be that the locally recorded information reaches the preset number, or preset specific information is recorded, etc.

In the embodiment of the present disclosure, the information to be recorded by the UE may also be configured by the network. Specifically, the UE may receive configuration information from the network, and configure the 2-step RA related information to be recorded by the UE according to the configuration information. As another implementation, the information to be recorded may also be committed in advance. For example, some configuration information may be pre-stored locally in the UE. Thus, the UE may configure the 2-step RA related information to be recorded by the UE according to the local pre-stored information.

The method for transmitting information of the embodiments of the present disclosure is described above from the UE side, and the implementation of the embodiments of the present disclosure will be described below from the network side.

Figure 5:
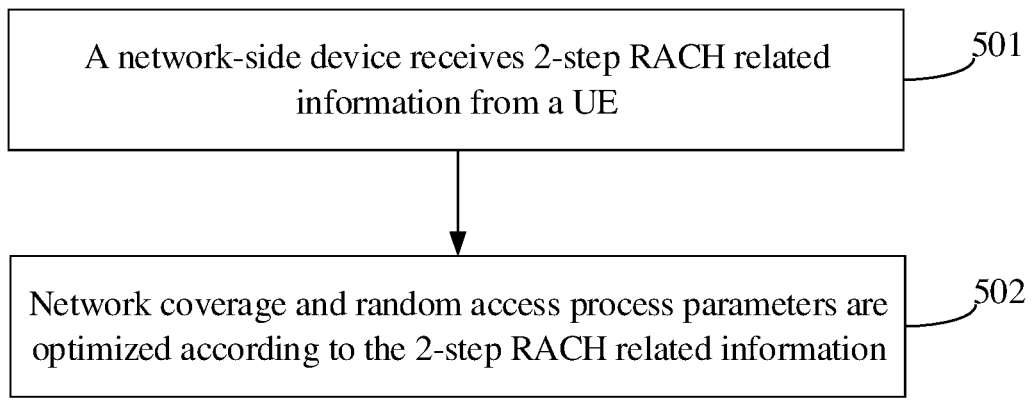
FIG. 5 is a flowchart of a method for receiving information applied to a network side according to an embodiment of the present disclosure.

Referring to FIG. 5, embodiments of the present disclosure provide a method for receiving information, which is applied to a network-side device, and the network-side device may specifically be a base station, a network management, a Trace Collection Entity (TCE) or other devices. As illustrated in FIG. 5, the method for receiving information includes the following operations.

At S501, a network-side device receives 2-step RA related information from a UE.

Here, the network-side device may receive the 2-step RA related information from the UE through a random access report or a predefined message. Specifically, the 2-step RA related information may include at least one as follows.

a) A UE state when the UE initiates a 2-step RA.

Here, the UE state may include an idle state, an inactive state or a connected state, etc.

b) A scenario where the UE initiates the 2-step RA.

Here, the scenario of initiating 2-step RA may specifically include a Radio Resource Control (RRC) connection establishment request (i.e., the 2-step RA is initiated since the UE needs to establish an RRC connection), a connection resume request, or random access caused by conditional handover, etc. Herein, when the scenario is the RRC connection establishment request, it may be further recorded whether the RRC connection establishment request is an initial connection establishment request initiated by the UE, or a connection re-establishment request initiated after Radio Link Failure (RLF) or check failure or compliance check failure, or a random access procedure due to cell selection.

c) Information of a PUSCH resource (e.g., size and/or position of the resource) for a msg A configured by the network side to the UE. In addition, a size of the msg A transmitted when the UE initiates the 2-step RA, a payload size of the msg A or PUSCH (i.e., size of the overall payload available in the UE buffer at the time of initiating the 2-step RA), a padding size of the msg A or PUSCH, etc. may also be included here.

d) Whether a quality of a reference signal is higher than a threshold configured by the network when the UE initiates the 2-step RA.

Here, the reference signal may include a SSB and a CSI-RS. The threshold configured by the network is a msgA-RSRP-ThresholdSSB, a msgA-RSRP-Threshold-SSB-SUL, a msgA-RSRP-ThresholdCSI-RS, or a msgA-RSRP-ThresholdCSI-RS-SUL, etc.

e) Whether the 2-step RA and a 4-step RA initiated by the UE share random access resources.

f) Resource information of the shared random access resources when the 2-step RA and the 4-step RA initiated by the UE share the random access resources.

Here, whether the 2-step RA and the 4-step RA initiated by the UE share random access resources may include whether the random access resources used when the UE initiates the 2-step RA (which may specifically include RA Occasions (RO) in a PRACH occasion, preambles, etc.) are shared with the 4-step RA. The specific shared random access resources may include ROs or preambles, and the like shared on each SSB.

g) A number of SSBs of the 2-step RA mapped to each PRACH occasion.

h) Transmission parameters of the msg A transmitted when the UE initiates the 2-step RA. The transmission parameters include at least one of a frequency-domain starting position, a subcarrier spacing (when the UE is only configured with a Bandwidth Part (BWP) of the 2-step RA), a number of msgA-RO-FDM, a maximum number of the msg A transmitted before switching to the 4-step RA, a msgA-PRCH-ConfigurationIndex and a msgA-RO-FrequencyStart.

i) Whether the UE is configured with a msgA-PRACH-RootSequenceIndex.

j) Whether a ra-Prioritization field is applied to access identities.

k) A maximum number of preambles allowed to be transmitted before declaring failure. For example, the maximum number of preambles allowed to be transmitted before declaring that the random access fails.

l) A length of a time window for receiving a msg B configured by the network side.

Through the above operations, the network-side device may receive the 2-step RA related information, so that the information when the terminal initiates the 2-step RA process can be obtained and reference information can be further provided for the subsequent optimization of the configuration of random access related parameters.

In an embodiment, before S501, the network-side device may also transmit configuration information to the UE to configure the 2-step RA related information to be recorded by the UE.

At S501, the network-side device may receive the 2-step RA related information actively transmitted by the UE. Alternatively, the network-side device may also transmit a request message to the UE, and receive the 2-step RA related information transmitted by the UE according to the request message.

In an embodiment, before transmitting the request message, the network-side device may also receive indication information of a 2-step RA related log recorded by the UE from the UE, determines whether to request the 2-step RA related information recorded by the UE according to the indication information of the log, and transmits the request message to the UE when necessary.

In an embodiment, as illustrated in FIG. 5, after S501, the network-side device may also execute S502 so as to optimize network coverage and random access procedure parameters according to the 2-step RA related information. For example:

1) Information such as a frequency-domain position, an adopted preamble sequence, waiting time for the msg B and the like of the 2-step RA process with successful or failed access are determined according to at least one of information h, i, j, or l. Configuration of relevant parameters is optimized according to the above determined information. For example, if a number of UEs with failed access in a preset statistical time period exceeds a preset threshold, the above frequency-domain position, preamble sequence, waiting time and the like may be reconfigured.

2) For inactive and idle UE, different 2-step RA parameters are configured for the inactive and idle UE in combination with the information a and c. For example, in a case that the RA resources are limited, more 2-step RA resources may be allocated to the inactive UE to reduce a delay of the 2-step RA of the inactive UE, so as to make the inactive UE enter a connected state as soon as possible.

3) For a scenario of initiating the RA, targeted optimization is performed on the RA resources in the scenario in combination with at least one of the above information b, c, h, i, j and l. For example, when the 2-step RA fails in the scenario of conditional handover, the network side may adjust an initiation threshold of the conditional handover, waiting time for the msg B, and the like of the 2-step RA in the conditional handover.

4) According to the above information d, the network side may determine whether the corresponding threshold is configured reasonably. For example, if the SSB selected by the UE is higher than a corresponding threshold and a failure occurs, the threshold may be configured too low, and the threshold may be raised at this time.

5) According to at least one of the above information e, h, i, j and l, the network side may determine whether to share the random access resources between the 2-step RA and the 4-step RA or not, and determine how many random access resources to be shared. For example, when a collision probability of the 2-step RA is high and a success probability of the 4-step RA is high, the network side may tilt a resource allocation to the 2-step RA.

The above describes various methods of the embodiments of the present disclosure. An apparatus for implementing the above method is further described below.

Figure 6:
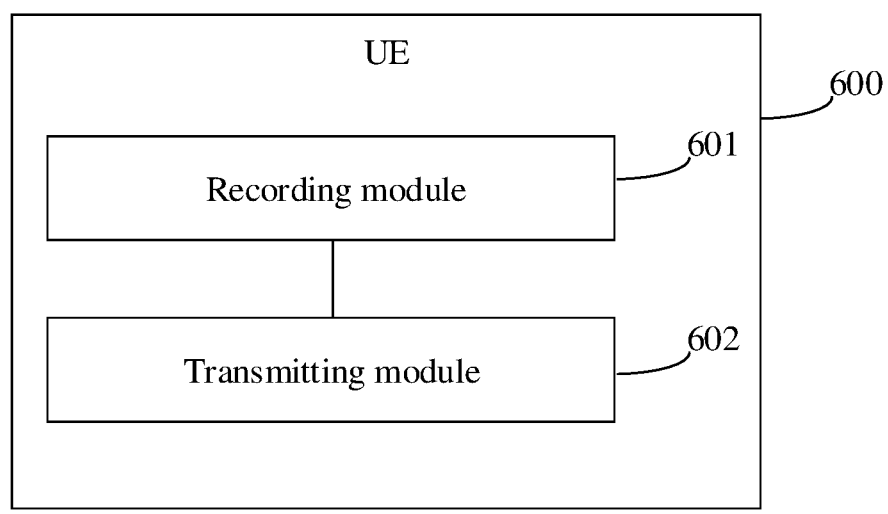
FIG. 6 is a structural diagram of a UE according to an embodiment of the present disclosure.

Referring to FIG. 6, embodiments of the present disclosure provide a UE 600, which includes a recording module 601 and a transmitting module 602.

The recording module 601 is configured to record 2-step RA related information.

The transmitting module 602 is configured to transmit the 2-step RA related information to a network.

In an embodiment, the 2-step RA related information may include at least one of the following:

A UE state when the UE initiates a 2-step RA;

A scenario where the UE initiates the 2-step RA;

Information of a PUSCH resource for a msg A configured by the network to the UE;

Whether a quality of a reference signal is higher than a threshold configured by the network when the UE initiates the 2-step RA;

Whether the 2-step RA and a 4-step RA initiated by the UE share random access resources;

Resource information of the shared random access resources when the 2-step RA and the 4-step RA initiated by the UE share the random access resources;

A number of SSBs of the 2-step RA mapped to each PRACH occasion;

Transmission parameters of the msg A transmitted when the UE initiates the 2-step RA, the transmission parameters including at least one of a frequency-domain starting position, a subcarrier spacing, a number of msgA-RO-FDM, a maximum number of the msg A transmitted before switching to the 4-step RA, a msgA-PRACH-ConfigurationIndex and a msgA-RO-FrequencyStart;

Whether the UE is configured with a PRACH root sequence or a PRACH root sequence index of the msg A;

Whether a ra-Prioritization field is applied to access identities;

A maximum number of preambles allowed to be transmitted before declaring failure; or A length of a time window for receiving a msg B configured by the network side.

In an embodiment, the reference signal includes an SSB and a CSI-RS. The threshold configured by the network is a msgA-RSRP-ThresholdSSB, a msgA-RSRP-Threshold-SSB-SUL, a msgA-RSRP-ThresholdCSI-RS, or a msgA-RSRP-ThresholdCSI-RS-SUL.

In an embodiment, the transmitting module is configured to transmit the 2-step RA related information when the UE is in an idle state or an inactive state or in a connected state or in a process of switching to a connected state.

In an embodiment, the 2-step RA related information is transmitted through a random access report or a predefined message.

In an embodiment, the transmitting module is configured to actively transmit the 2-step RA related information to the network, or transmit the 2-step RA related information to the network after the UE receives a request message from the network.

In an embodiment, the transmitting module is configured to transmit indication information of a 2-step RA related log recorded by the UE to the network before receiving the request message from the network.

In an embodiment, the UE further includes a configuration module.

The configuration module is configured to receive configuration information from the network and configure the 2-step RA related information to be recorded by the UE according to the configuration information, or configure the 2-step RA related information to be recorded by the UE according to local pre-stored information.

It is to be notated that the UE in the embodiment is an apparatus corresponding to the method illustrated in FIG. 4, and the implementations in the above-mentioned embodiments are all applicable to the embodiments of the apparatus, and can also achieve the same technical effects. The UE provided by the embodiment of the present disclosure can implement all the method operations in the method embodiments, and can achieve the same technical effects. The same parts and beneficial effects in the embodiments as those of the method embodiments are not elaborated here.

Figure 7:
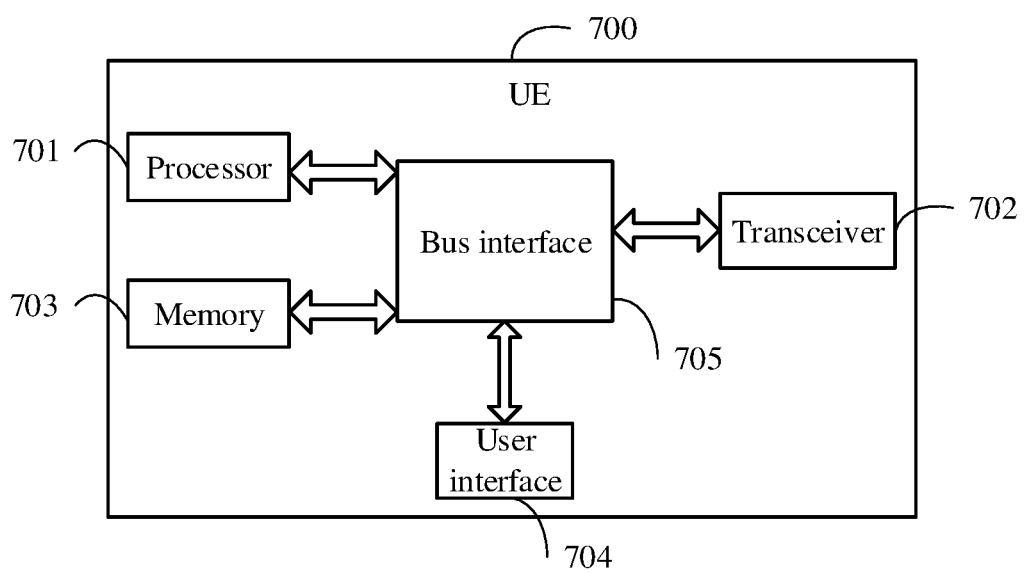
FIG. 7 is another structural diagram of a UE according to an embodiment of the present disclosure.

Referring to FIG. 7, FIG. 7 illustrates a structural diagram of a UE provided by the embodiments of the present disclosure. The UE 700 includes a processor 701, a transceiver 702, a memory 703, a user interface 704 and a bus interface 705.

In the embodiments of the present disclosure, the UE 700 further includes programs stored on the memory 703 and being capable of running on the processor 701.

When executing the program, the processor 701 implements the following operations.

2-step RA related information is recorded.

The 2-step RA related information is transmitted to a network.

It is to be understood that, in the embodiments of the present disclosure, when executed by a processor 701, the computer programs may implement each process of the embodiments of the method for transmitting information illustrated in FIG. 3 and can achieve the same technical effects, which would not be described herein to avoid repetition.

In FIG. 7, a bus architecture may include any number of interconnected buses and bridges. Specifically, one or more processors represented by the processor 701 are linked with various circuits of the memory represented by the memory 703. In practical application, the bus architecture may also link various other circuits, such as a peripheral device, a voltage regulator and a power management circuit, which is not limited in the embodiments of the present disclosure. The bus interface 705 provides an interface. The transceiver 702 may include multiple elements (i.e., include a transmitter and a receiver) and provide a unit configured to communicate with various other devices on a transmission medium. For different user devices, the user interface 704 may also be an interface that can externally and internally connect a required device, and the connected device includes but is not limited to a keypad, a display, a speaker, a microphone, a joystick, and the like.

The processor 701 is responsible for managing the bus architecture and general processing, and the memory 703 may store data used by the processor 701 when executing operations.

It is to be notated that the UE in the embodiment is corresponding to the method illustrated in FIG. 4, and the implementations in the above-mentioned embodiments are all applicable to the embodiments of the UE, and can also achieve the same technical effects. In the UE, the transceiver 702 and the memory 703, as well as the transceiver 702 and the processor 701 may be in communication connection through the bus interface 705. The function of the processor 701 may also be implemented by the transceiver 702, and the function of the transceiver 702 may also be implemented by the processor 701. It is to be noted here that the UE provided by the embodiment of the present disclosure can implement all the method operations implemented in the method embodiments, and can achieve the same technical effects. The same parts and beneficial effects in the embodiments as those of the method embodiments are not elaborated here.

In some embodiments of the present disclosure, a computer-readable storage medium is further provided. Programs are stored on the computer-readable storage medium. When executed by a processor, the programs implement the following operations.

2-step RA related information is recorded.

The 2-step RA related information is transmitted to a network.

When executed by a processor, the programs may implement all implementations of the method for transmitting information applied to the UE side, and can achieve the same technical effects, which would not be described herein to avoid repetition.

Embodiments of the present disclosure further provide a network-side device 800, which includes a receiving module 801.

The receiving module 801 is configured to receive 2-step RA related information from a UE.

In an embodiment, the 2-step RA related information includes at least one of the following:

A UE state when the UE initiates a 2-step RA;

A scenario where the UE initiates the 2-step RA;

Information of a PUSCH resource for a msg A configured by the network to the UE;

Whether a quality of a reference signal is higher than a threshold configured by the network when the UE initiates the 2-step RA;

Whether the 2-step RA and a 4-step RA initiated by the UE share random access resources;

Resource information of the shared random access resources when the 2-step RA and the 4-step RA initiated by the UE share the random access resources;

A number of SSBs of the 2-step RA mapped to each PRACH occasion;

Transmission parameters of the msg A transmitted when the UE initiates the 2-step RA, the transmission parameters including at least one of a frequency-domain starting position, a subcarrier spacing, a number of msgA-RO-FDM, a maximum number of the msg A transmitted before switching to the 4-step RA, a msgA-PRACH-ConfigurationIndex and a msgA-RO-FrequencyStart;

Whether the UE is configured with a PRACH root sequence or a PRACH root sequence index of the msg A;

Whether a ra-Prioritization field is applied to access identities;

A maximum number of preambles allowed to be transmitted before declaring failure; or A length of a time window for receiving a msg B configured by the network side.

In an embodiment, the network-side device further includes a transmitting module.

The transmitting module is configured to transmit configuration information to the UE to configure the 2-step RA related information to be recorded by the UE.

In an embodiment, the 2-step RA related information is transmitted through a random access report or a predefined message.

In an embodiment, the receiving module is configured to receive the 2-step RA related information actively transmitted by the UE. Alternatively, the receiving module is configured to transmit a request message to the UE, and receive the 2-step RA related information transmitted by the UE according to the request message.

In an embodiment, the receiving module is configured to receive indication information of a 2-step RA related log recorded by the UE from the UE.

Figure 8:
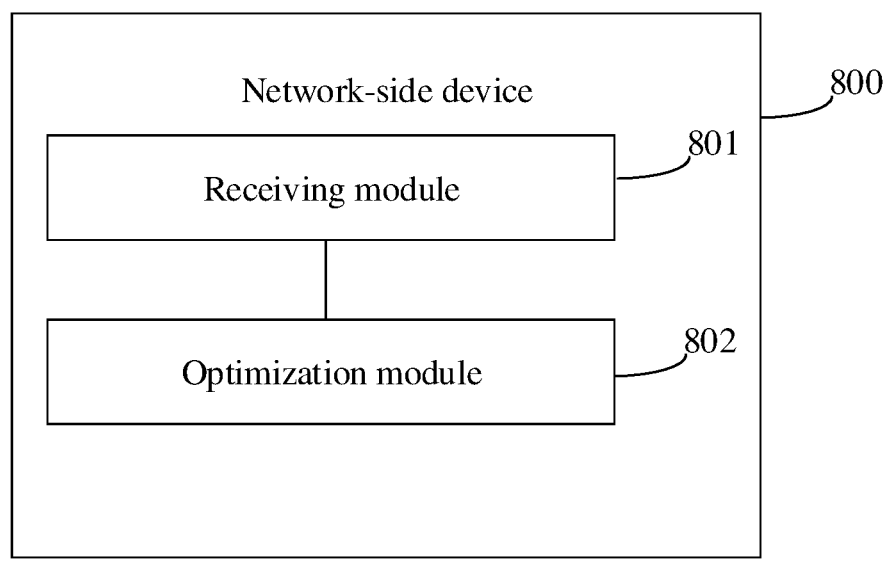
FIG. 8 is a structural diagram of a network-side device according to an embodiment of the present disclosure.

In an embodiment, as illustrated in FIG. 8, the network-side device further includes an optimization module 802.

The optimization module 802 is configured to optimize network coverage and random access procedure parameters according to the 2-step RA related information.

It is to be notated that the apparatus in the embodiment is corresponding to the method illustrated in FIG. 5, and the implementations in the above-mentioned embodiments are all applicable to the embodiments of the apparatus, and can also achieve the same technical effects. It is to be noted here that the apparatus provided by the embodiment of the present disclosure can implement all the method operations implemented by the method embodiments, and can achieve the same technical effects. The same parts and beneficial effects in the embodiments as those of the method embodiments are not elaborated here.

Figure 9:
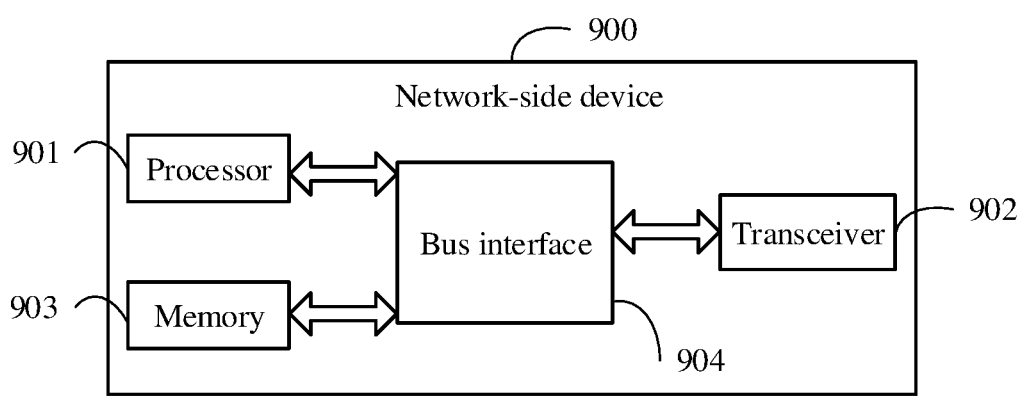
FIG. 9 is another structural diagram of a network-side device according to an embodiment of the present disclosure.

Referring to FIG. 9, embodiment of the present disclosure provides a structural diagram of a network-side device 900 which includes a processor 901, a transceiver 902, a memory 903 and a bus interface 904.

In the embodiment of the present disclosure, the network-side device 900 further includes programs stored in the memory 903 and being capable of running on the processor 901. The programs, when executed by the processor 901, implement the following operations.

2-step RA related information from a UE is received.

It is to be understood that, in the embodiment of the present disclosure, when executed by a processor 901, the computer programs may implement each process of the method for receiving information embodiments shown in FIG. 5 and can achieve the same technical effects, which is would not be described here to avoid repetition.

In FIG. 9, a bus architecture may include any number of interconnected buses and bridges. Specifically, one or more processors represented by the processor 901 are linked with various circuits of the memory represented by the memory 903. In practical application, the bus architecture may also link various other circuits, such as a peripheral device, a voltage regulator and a power management circuit, which is not limited in the embodiments of the present disclosure. The bus interface 904 provides an interface. The transceiver 902 may include multiple elements (i.e., include a transmitter and a receiver) and provide a unit configured to communicate with various other devices on a transmission medium.

The processor 901 is responsible for managing the bus architecture and general processing, and the memory 903 may store data used by the processor 901 when executing operations.

It is to be notated that the network-side device in the embodiment is corresponding to the method illustrated in FIG. 5, and the implementations in the above-mentioned embodiments are all applicable to the embodiments of the network-side device, and can also achieve the same technical effects. In the network-side device, the transceiver 902 and the memory 903, as well as the transceiver 902 and the processor 901 may be in communication connection through the bus interface 904. The function of the processor 901 may also be implemented by the transceiver 902, and the function of the transceiver 902 may also be implemented by the processor 901. It is to be noted here that the network-side device provided by the embodiment of the present disclosure can implement all the method operations implemented in the method embodiments, and can achieve the same technical effects. The same parts and beneficial effects in the embodiments as those of the method embodiments are not elaborated here.

In some embodiments of the present disclosure, a computer-readable storage medium is further provided. Programs are stored on the computer-readable storage medium. When executed by a processor, the programs implement the following operations.

2-step RA related information from a UE is received.

When executed by a processor, the programs may implement all implementations of the method for receiving information applied to the network-side device side, and can achieve the same technical effects, which would not be described here to avoid repetition.

Those skilled in the art will appreciate that the various example units and algorithm steps described in connection with the embodiments disclosed herein can be implemented in electronic hardware or a combination of computer software and electronic hardware. Whether these functions are performed in hardware or software form depends on specific applications and design constraints of the technical scheme. Those skilled may use different methods for each specific application to implement the described functions but such implementation should not be considered beyond the scope of the present disclosure.

Those skilled in the art will clearly appreciate that for convenience and conciseness of description, the specific operating processes of the above-mentioned systems, devices and units may refer to the corresponding processes in the aforementioned method embodiments and will not be repeated herein.

In the embodiments provided herein it should be understood that the disclosed devices and methods may be implemented in other ways. For example, the above-mentioned embodiments of the device are only schematic. For example, the division of the unit is only a logical functional division, and in practice, there may be another division manner For example, multiple units or components may be combined or integrated into another system, or some features may be ignored or not performed. On the other hand, the coupling or direct coupling or communication connection between each other illustrated or discussed may be indirect coupling or communication connection through some interface, device or unit, and may be electrical, mechanical or other forms.

The units described as separate parts may or may not be physically separated, and parts displayed as units may or may not be physical units, namely they may be located in the same place, or may be distributed to multiple network units. Part or all of the units may be selected to achieve the purposes of the solutions of the embodiments of the present disclosure according to a practical requirement.

In addition, the functional units in various embodiments of the present disclosure may be integrated in one processing unit, or each unit may exist physically individually, or two or more units may be integrated in one unit.

The functions may be stored in a computer-readable storage medium if implemented in form of software functional units and sold or used as stand-alone products. Based on such an understanding, the essence of the technical solutions of the present disclosure, or the part that contributes to the related technologies, or part of the technical solutions can be embodied in the form of a software product stored in a storage medium including several instructions, which can be executed by a computer device (which may be a personal computer, a server, or a base station, etc.) to implement all or part of the operations of the measurement configuration method described in the various embodiments of the present disclosure. The foregoing storage medium includes a Universal Serial Bus (USB) flash drive, a removable hard disk, a Read-Only Memory (ROM), a Random Access Memory (RAM), a magnetic disk, an optical disk, or any other medium that can store program code.

The foregoing description is merely specific embodiments of the present disclosure, but the scope of protection of the present disclosure is not limited hereto. Any variation or replacement readily contemplated by those skilled in the art within the scope of the present disclosure should be included within the scope of protection of the present disclosure. Therefore, the scope of protection of the present disclosure shall be limited by the scope of protection of the claims.

The invention claimed is:

1. A method for transmitting information, comprising:
   recording, by a User Equipment (UE), 2-step Random Access (RA) related information; and
   transmitting, by the UE, the 2-step RA related information to a network device;
   wherein the 2-step RA related information comprises at least one of the following:
      a UE state when the UE initiates a 2-step RA:
      a scenario where the UE initiates the 2-step RA;
      information of a Physical Uplink Shared Channel (PUSCH) resource for a message A (msg A) configured by the network device to the UE:
      whether a quality of a reference signal is higher than a threshold configured by the network device when the UE initiates the 2-step RA;
      whether the 2-step RA and a 4-step RA initiated by the UE share random access resources:
      resource information of the shared random access resources when the 2-step RA and the 4-step RA initiated by the UE share the random access resources;
      a number of Synchronization Signal and PBCH Blocks (SSBs) of the 2-step RA mapped to each Physical Random Access Channel (PRACH) occasion:
      transmission parameters of the msg A transmitted when the UE initiates the 2-step RA. the transmission parameters comprising at least one of a frequency-domain starting position, a subcarrier spacing. a number of msg A PRACH transmission occasions frequency-division multiplexed in one time instance (msgA-RO-FDM), a maximum number of the msg A transmitted before switching to the 4-step RA. a PRACH configuration index of the msg A (msgA-PRACH-ConfigurationIndex) and a frequency offset of a lowest point in a frequency-domain of PRACH transmission occasions relative to a Physical Resource Block number 0 (PRB0) (msgA-RO-FrequencyStart);
      whether the UE is configured with a PRACH root sequence or a PRACH root sequence index of the msg A:
      whether a ra-Prioritization field is applied to access identities:
      a maximum number of preambles allowed to be transmitted before declaring failure; or
      a length of a time window for receiving a message B (msg B) configured by the network device.

2. The method of claim 1, wherein
   the reference signal comprises an SSB and a Channel State Information-Reference Signal (CSI-RS), and
   the threshold configured by the network device is the following:
      a Reference Signal Received Power (RSRP) threshold of an SSB corresponding to random access resources for transmitting the msg A (msgA-RSRP-ThresholdSSB), an RSRP threshold of an Supplementary Uplink (SUL) of the SSB corresponding to the random access resources for transmitting the msg A (msgA-RSRP-ThresholdSSB- SUL),
      an RSRP threshold of a CSI-RS corresponding to the random access resources for transmitting the msg A (msgA-RSRP-ThresholdCSI-RS), or
      an RSRP threshold of an SUL of the CSI-RS corresponding to the random access resources for transmitting the msg A (msgA-RSRP-ThresholdCSI-RS-SUL).

3. The method of claim 1, wherein transmitting, by the UE, the 2-step RA related information to the network device comprises:
   transmitting, by the UE, the 2-step RA related information when the UE is in an idle state or in an inactive state or in a connected state or in a process of switching to the connected state.

4. The method of claim 3, wherein the 2-step RA related information is transmitted through a random access report or a predefined message.

5. The method of claim 3, wherein transmitting the 2-step RA related information comprises:
   actively transmitting, by the UE, the 2-step RA related information to the network device; or
   transmitting, by the UE, after receiving a request message from the network device, the 2-step RA related information to the network device.

6. The method of claim 5, wherein before receiving the request message from the network device, the method further comprises:
   transmitting, by the UE, indication information of a 2-step RA related log recorded by the UE to the network device.

7. The method of claim 1, wherein before recording the 2-step RA related information, the method further comprises:
   receiving configuration information from the network device, and configuring, according to the configuration information, the 2-step RA related information to be recorded by the UE; or
   configuring, according to local pre-stored information, the 2-step RA related information to be recorded by the UE.

8. A User Equipment (UE), comprising a transceiver and a processor,
wherein the processor is configured to record 2-step Random Access (RA) related information,
wherein the transceiver is configured to enable the UE to transmit the 2-step RA related information to a network device;
wherein the 2-step RA related information comprises at least one of the following:
a UE state when the UE initiates a 2-step RA:
a scenario where the UE initiates the 2-step RA;
information of a Physical Uplink Shared Channel (PUSCH) resource for a message A (msg A) configured by the network device to the UE;
whether a quality of a reference signal is higher than a threshold configured by the network device when the UE initiates the 2-step RA;
whether the 2-step RA and a 4-step RA initiated by the UE share random access resources:
resource information of the shared random access resources when the 2-step RA and the 4-step RA initiated by the UE share the random access resources;
a number of Synchronization Signal and PBCH Blocks (SSBs) of the 2-step RA mapped to each Physical Random Access Channel (PRACH) occasion;
transmission parameters of the msg A transmitted when the UE initiates the 2-step RA, the transmission parameters comprising at least one of a frequency-domain starting position, a subcarrier spacing, a number of msg A PRACH transmission occasions frequency-division multiplexed in one time instance (msgA-RO-FDM), a maximum number of the msg A transmitted before switching to the 4-step RA, a PRACH configuration index of the msg A (msgA-PRACH-ConfigurationIndex) and a frequency offset of a lowest point in a frequency-domain of PRACH transmission occasions relative to a Physical Resource Block number 0 (PRBO) (msgA-RO-FrequencyStart);
whether the UE is configured with a PRACH root sequence or a PRACH root sequence index of the msq A:
whether a ra-Prioritization field is applied to access identities:
a maximum number of preambles allowed to be transmitted before declaring failure; or
a length of a time window for receiving a message B (msg B) configured by the network device.

* * * * *